United States Patent
Niwa et al.

(10) Patent No.: US 12,330,521 B2
(45) Date of Patent: Jun. 17, 2025

(54) VEHICLE, CHARGING SYSTEM, AND METHOD OF CONTROLLING VEHICLE

(71) Applicant: TOYOTA JIDOSHA KABUSHIKI KAISHA, Aichi-ken (JP)

(72) Inventors: Yamato Niwa, Kariya (JP); Shigeki Kinomura, Toyota (JP); Yoshiyuki Tsuchiya, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 519 days.

(21) Appl. No.: 17/830,342

(22) Filed: Jun. 2, 2022

(65) Prior Publication Data

US 2022/0388411 A1    Dec. 8, 2022

(30) Foreign Application Priority Data

Jun. 3, 2021  (JP) .................. 2021-093408

(51) Int. Cl.
*B60L 53/31* (2019.01)
*B60L 53/16* (2019.01)
*B60L 53/30* (2019.01)
*B60L 53/35* (2019.01)
*G08B 5/36* (2006.01)
*G06T 19/00* (2011.01)

(52) U.S. Cl.
CPC .............. *B60L 53/31* (2019.02); *B60L 53/16* (2019.02); *B60L 53/305* (2019.02); *B60L 53/35* (2019.02); *G08B 5/36* (2013.01); *G06T 19/00* (2013.01)

(58) Field of Classification Search
CPC .................................................... B60L 53/31
USPC .................................................... 320/109
See application file for complete search history.

(56) References Cited

U.S. PATENT DOCUMENTS

| | | | |
|---|---|---|---|
| 2013/0307477 A1* | 11/2013 | Reinschke | B60L 53/30 320/109 |
| 2015/0266379 A1 | 9/2015 | Bellin et al. | |
| 2016/0042401 A1 | 2/2016 | Menendez et al. | |
| 2018/0012196 A1* | 1/2018 | Ricci | G06Q 20/308 |
| 2018/0339597 A1* | 11/2018 | Kruszelnicki | B60L 53/305 |
| 2020/0006969 A1* | 1/2020 | Penilla | H04L 67/04 |
| 2020/0324661 A1 | 10/2020 | Freeling-Wilkinson | |

(Continued)

FOREIGN PATENT DOCUMENTS

| | | |
|---|---|---|
| JP | 2012-135135 A | 7/2012 |
| JP | 5475407 B2 | 4/2014 |
| JP | 2017-528852 A | 9/2017 |

(Continued)

*Primary Examiner* — Jerry D Robbins
(74) *Attorney, Agent, or Firm* — HAUPTMAN HAM, LLP

(57) ABSTRACT

A vehicle is configured to enable electric power to be fed from a charging stand to the vehicle and/or fed from the vehicle to the charging stand. The charging stand includes a movable unit and an elevation unit. The movable unit includes a charging connector to be connected to the vehicle. The elevation unit lifts and lowers the movable unit between a stored state in which the movable unit is stored underground and an exposed state in which the movable unit is exposed from ground. The vehicle includes an HMI and an ECU that controls the HMI. When the charging stand is available, the ECU controls the HMI to display that the charging stand is available, in a manner that the position of the charging stand can be identified from the vehicle.

8 Claims, 6 Drawing Sheets

(56) References Cited

U.S. PATENT DOCUMENTS

2021/0053456 A1* 2/2021 Freeling-Wilkinson ..................... B60L 53/18
2022/0144113 A1* 5/2022 Freeling-Wilkinson ..................... B60L 53/31

FOREIGN PATENT DOCUMENTS

KR 10-2020-0057838 A 5/2020
WO 2019/073271 A1 4/2019

* cited by examiner

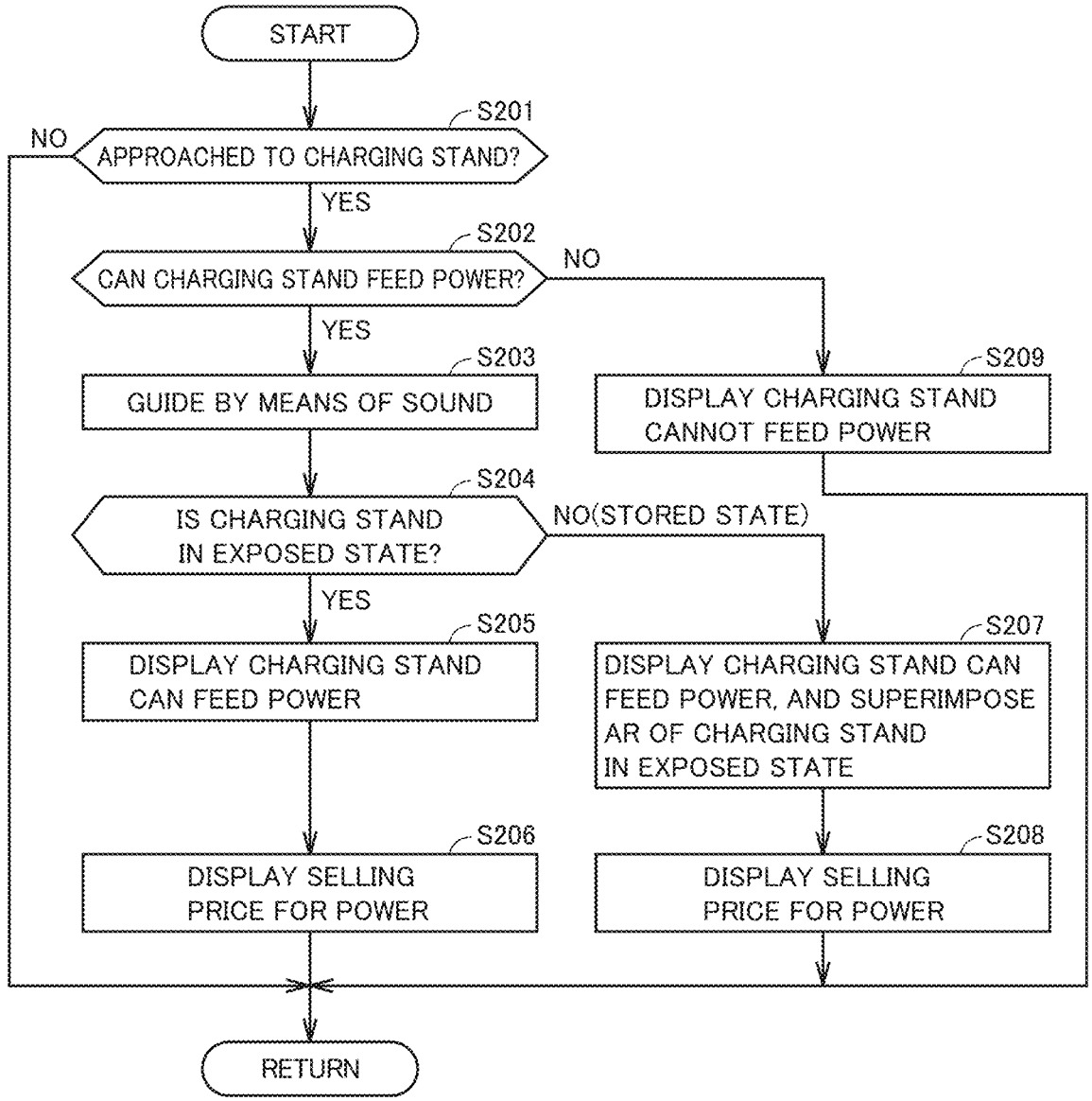

VEHICLE, CHARGING SYSTEM, AND METHOD OF CONTROLLING VEHICLE

This nonprovisional application is based on Japanese Patent Application No. 2021-093408 filed on Jun. 3, 2021 with the Japan Patent Office, the entire contents of which are hereby incorporated by reference.

BACKGROUND

Field

The present disclosure relates to a vehicle, a charging system, and a method of controlling the vehicle, and more specifically relates to a control technique for a vehicle configured to enable electric power to be fed from a charging facility to the vehicle and/or fed from the vehicle to the charging facility.

Description of the Background Art

Vehicles that can be charged with electric power supplied from a source external to the vehicles, i.e., charged by so-called plug-in charging, are becoming widespread. Charging facilities for plug-in charging are generally installed in parking lots or the like and occupy a certain extent of space for installation. A technique has therefore been proposed for providing a movable charging facility that is stored underground. For example, a charging pole disclosed in Japanese Patent No. 5475407 can be placed upright on the ground and can also be stored underground.

SUMMARY

There may be a situation where a user searches for the location of an available movable charging facility. For example, if a user reserves a charging facility in advance, the user having arrived at the neighborhood of the charging facility would search for the charging facility reserved by the user. The charging facility which is not in use, however, is stored underground. It may therefore be difficult for the user on the ground to find the reserved charging facility.

The present disclosure is given to solve the above-identified problem, and one of the objects of the present disclosure is to enable a user to easily find an available charging facility.

(1) A vehicle according to an aspect of the present disclosure is configured to enable electric power to be fed from a charging facility to the vehicle and/or fed from the vehicle to the charging facility. The charging facility includes: a movable device having a connector to be connected to the vehicle; and an elevation device that lifts and lowers the movable device between a stored state in which the movable device is stored underground and an exposed state in which the movable device is exposed from ground. The vehicle includes: a display; and a controller that controls the display. When the charging facility is available, the controller controls the display to display that the charging facility is available, in a manner that a position of the charging facility can be identified from the vehicle.

With the above features of (1), the display displays that the charging facility is available, which enables the user to easily find the available charging facility.

(2) When the charging facility is available and the movable device is in the stored state, the controller controls the display to display the movable device in the exposed state.

(3) The controller controls the display to display an augmented reality in which an image of the movable device in the exposed state is superimposed on an image of the movable device in the stored state.

With the above features of (2) and (3), the movable device is displayed in the exposed state even when the movable device is in the stored state actually, which enables the user to more easily find the available charging facility.

(4) When the charging facility is unavailable, the controller controls the display to display that the charging facility is unavailable.

With the features of (4), the display displays that the charging facility is unavailable, and therefore, the possibility that the user erroneously identifies an unavailable charging facility as an available charging facility can be reduced.

(5) The controller controls the display to further display a price for electric power traded through the charging facility.

With the features of (5), the user can additionally know the trading price for electric power (charging price or power selling price).

(6) The display includes a head-up display.

The above feature of (6) enables a user to easily find an available charging facility even when user is driving the vehicle.

(7) The vehicle further includes a speaker that informs, when the charging facility is available, a user of the vehicle that the vehicle has approached the charging facility.

With the above features of (7), the sense of hearing is used in addition to the sense of sight, which enables the user to more easily find an available charging facility.

(8) A charging system according to another aspect of the present disclosure includes the vehicle and the charging facility as described above.

(9) As to a method of controlling a vehicle according to a further aspect of the present disclosure, the vehicle includes a display and is configured to enable electric power to be fed from a charging facility to the vehicle and/or fed from the vehicle to the charging facility. The charging facility includes: a movable device having a connector to be connected to the vehicle; and an elevation device that lifts and lowers the movable device between a stored state in which the movable device is stored underground and an exposed state in which the movable device is exposed from ground. The method includes: acquiring information of whether or not the charging facility is available; and displaying, when the charging facility is available, on the display that the charging facility is available, in a manner that a position of the charging facility can be identified from the vehicle.

The above features of (8) or the above method of (9) enable the user to easily find an available charging facility, as with the above features of (1).

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 is a flowchart showing a procedure of a power-feeding guide process according to Embodiment 2.

DESCRIPTION OF THE PREFERRED EMBODIMENTS

Figure 1:
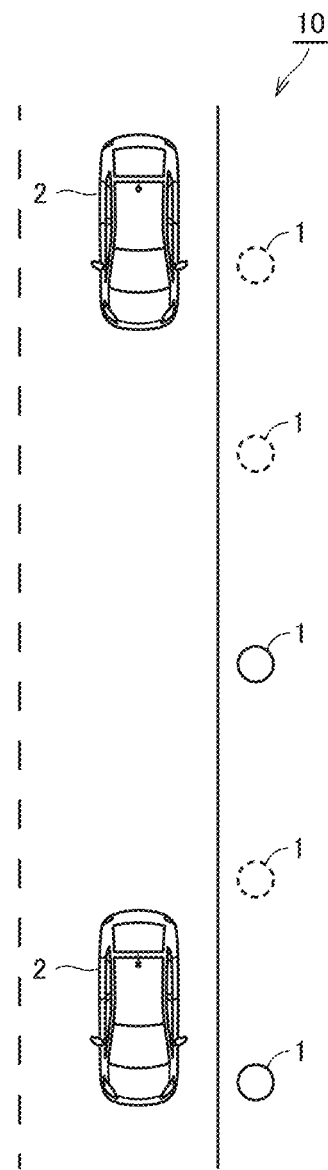
FIG. 1 shows an example layout of a charging system according to Embodiment 1.

Embodiments of the present disclosure are described hereinafter with reference to the drawings. In the drawings, the same or corresponding parts are denoted by the same reference characters and a description thereof is not herein repeated.

Embodiment 1

<Configuration of Charging System>

FIG. 1 shows an example layout of a charging system 10 according to Embodiment 1. FIG. 1 illustrates that a vehicle 2 is parked in each of two parking spaces among a plurality of parking spaces provided in a parking lot.

In the present embodiment, charging system 10 includes a plurality of charging stands 1. A plurality of charging stands 1 are each installed in a space (walkway for example) adjacent to a parking space. The number of installed charging stands 1, however, is not particularly limited. The number of installed charging stands 1 may also be only one. Charging stand 1 corresponds to "charging facility" according to the present disclosure.

Each charging stand 1 is configured to be lowered and lifted between a "stored state" of being stored underground and an "exposed state" of being exposed from the ground (movable up-and-down). In FIG. 1, charging stand 1 exposed from the ground is indicated by a solid line and charging stand 1 stored underground is indicated by a dashed line.

Figure 2:
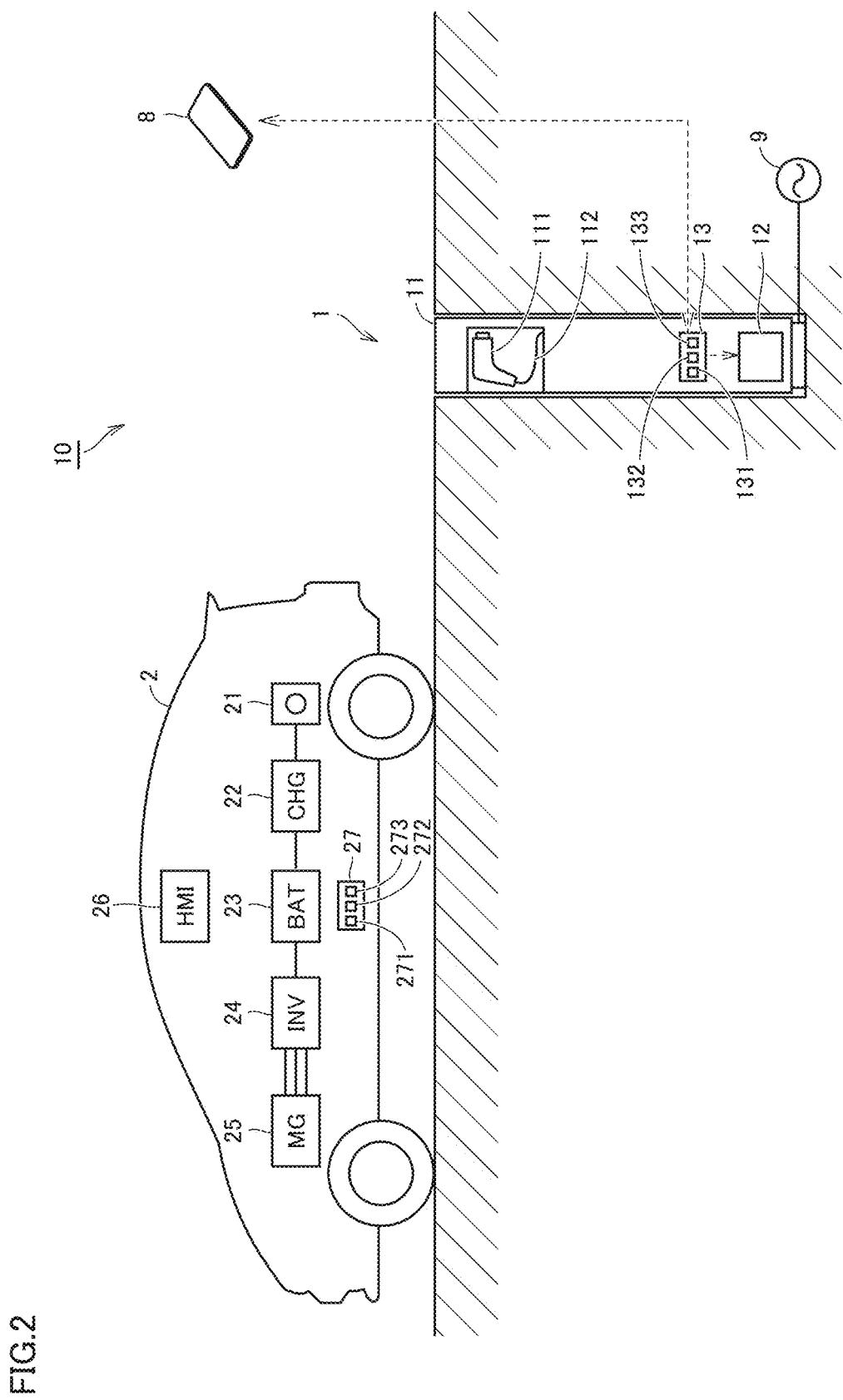
FIG. 2 shows an example configuration of a charging stand that is stored underground and a vehicle.
Figure 3:
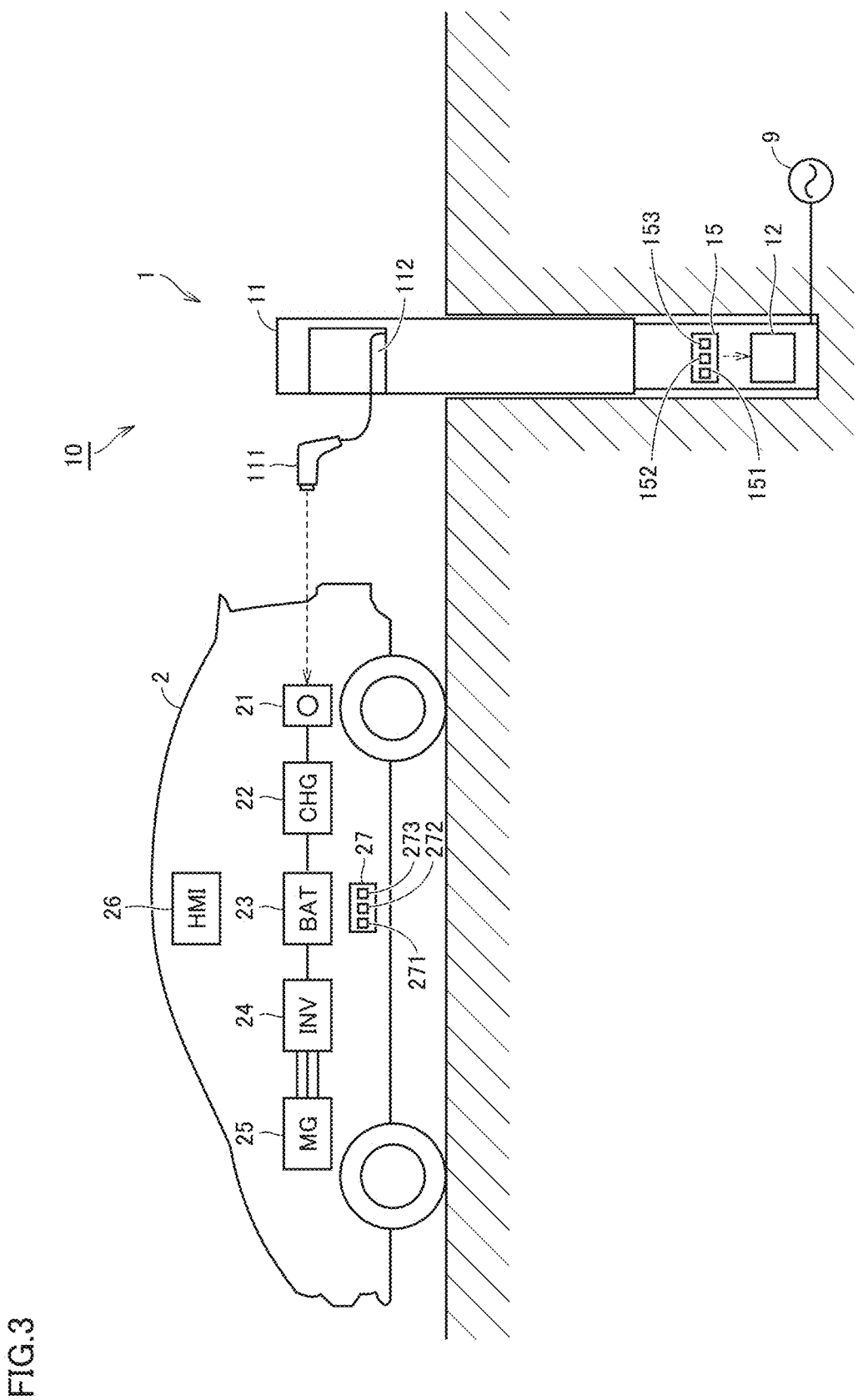
FIG. 3 shows an example configuration of the charging stand that is exposed from the ground and the vehicle.

FIG. 2 shows an example configuration of charging stand 1 that is stored underground and vehicle 2. FIG. 3 shows an example configuration of charging stand 1 that is exposed from the ground and vehicle 2. The stored state as shown in FIG. 2 refers to a state of charging stand 1 having been lowered until the upper end of charging stand 1 is located substantially at the same height as the ground. The exposed state as shown in FIG. 3 refers to a state of charging stand 1 having been lifted until the upper end of charging stand 1 is located at a predetermined height above the ground.

Charging stand 1 has a cylindrical housing, for example. Charging stand 1 is installed on the bottom of a recess formed in the ground. The recess is formed to leave a predetermined gap to the outer peripheral surface of the housing of charging stand 1. The depth of the recess is substantially equal to the vertical length of charging stand 1 in the stored state.

Charging stand 1 is configured to enable plug-in charging of vehicle 2. Charging stand 1 may be configured to communicate with vehicle 2. In this case, charging stand 1 is controlled in accordance with operation performed by a user on an HMI (Human Machine Interface) 26 (described later herein) of vehicle 2. Charging stand 1 may be configured to communicate with a mobile terminal (smart phone for example) 8 of a user. In this case, charging stand 1 may be controlled in accordance with operation performed by a user on mobile terminal 8. A dedicated operation terminal (not shown) capable of operating a plurality of charging stands may separately be provided. Charging stand 1 includes a movable unit 11, an elevation unit 12, and a controller 13.

Movable unit 11 is configured to be lifted and lowered by elevation unit 12. While the direction in which movable unit 11 is lifted and lowered is the vertical direction in this example, the direction may be tilted by a predetermined angle from the vertical direction. Movable unit 11 includes a charging connector 111 and a charging cable 112. Charging connector 111 and charging cable 112 can be accommodated in a storage space provided in an upper portion of movable unit 11. Movable unit 11 corresponds to "movable device" according to the present disclosure.

Charging connector 111 is connected to an inlet 21 (described later herein) of vehicle 2. Charging connector 111 is electrically connected to one end of charging cable 112. To the other end of charging cable 112, a power supply 9 is electrically connected. Power supply 9 is an AC power supply such as commercial power supply, for example. A power converter (not shown) may be provided between charging cable 112 and power supply 9. Charging connector 111 can be removed by a user from the storage space to extend charging cable 112 to inlet 21. Charging connector 111 corresponds to "connector" according to the present disclosure.

Elevation unit 12 is secured to the bottom of the recess formed in the ground. Elevation unit 12 lifts and lowers movable unit 11 between the exposed state and the stored state. For elevation unit 12, any of various mechanisms may be employed. Specifically, elevation unit 12 may have a rack and pinion mechanism, have a mechanism using a hydraulic cylinder, or have a magnetic mechanism. The rack and pinion mechanism lifts and lowers movable unit 11 by rotating, with an electric actuator, a pinion gear engaged with a rack gear secured to movable unit 11. The mechanism using a hydraulic cylinder secures, to movable unit 11, a rod which is connected to a piston, and increases/decreases the pressure of oil supplied to the cylinder body to thereby lift/lower movable unit 11. The magnetic mechanism generates a magnetic repulsive force between movable unit 11 and elevation unit 12 to thereby lift and lower movable unit 11.

Moreover, elevation unit 12 desirably includes a mechanism (such as stopper) that restricts movement of movable unit 11 to prevent excessive up-and-down movement thereof. Thus, elevation unit 12 is configured to prevent movable unit 11 from being lowered beyond the position corresponding to the stored state, and configured to prevent movable unit 11 from being lifted beyond the position corresponding to the exposed state. Elevation unit 12 corresponds to "elevation device" according to the present disclosure.

Controller 13 includes a processor 131 such as CPU (Central Processing Unit), a memory 132 such as ROM (Read Only Memory) and RAM (Random Access Memory), and a communication module 133 capable of wired and/or wireless communication with an external device of charging stand 1. In the present embodiment, communication module 133 is configured to exchange various types of information with vehicle 2. Communication module 133 may be configured to communicate with a management server (not shown) that is capable of overall control of a plurality of charging stands 1.

Controller 13 controls constituent devices (elevation unit 12 for example) of charging stand 1, based on information stored in memory 132, information received via communication module 133, and/or information acquired from sensors (not shown). Controller 13 performs "lifting control" for lifting movable unit 11 and "lowering control" for lowering movable unit 11. The lifting control is performed, for example, when a user operates an UP button (not shown) displayed on HMI 26 of vehicle 2. The lowering control is performed w % ben a user operates a DOWN button (not shown) on HMI 26.

In this example, vehicle 2 is a battery electric vehicle. Vehicle 2 may at least be a vehicle that can be plug-in charged, and may for example be a plug-in hybrid electric vehicle. Vehicle 2 includes inlet 21, a charger 22, a battery 23, an inverter 24, a motor generator 25, HMI 26, and an ECU (Electronic Control Unit) 27.

Inlet 21 is placed inside a cover (not shown) such as lid provided in the exterior of vehicle 2. Inlet 21 is configured to allow charging connector 111 of charging stand 1 to be inserted in inlet 21. When charging connector 111 is inserted in inlet 21, inlet 21 and charging connector 111 are electrically connected to each other. Accordingly, electric power can be fed from charging stand 1 to vehicle 2.

When AC power is supplied from inlet 21, charger 22 converts the AC power into DC power, and supplies the DC power to battery 23. Battery 23 is a secondary battery such as nickel-metal hydride battery or lithium-ion battery. Charger 22 may also be configured to convert DC power from battery 23 into AC power and output (feed) the AC power to charging stand 1. The electric power fed to charging stand 1 may be electric power generated by motor generator 25.

Inverter 24 converts DC power stored in battery 23 into AC power, and supplies the AC power to motor generator 25. Inverter 24 also converts AC power (regenerative power) from motor generator 25 into DC power, and charges battery 23 with the DC power. Receiving electric power supplied from inverter 24, motor generator 25 applies rotational force to drive wheels to thereby cause vehicle 2 to run.

HMI 26 receives operation by a user (driver) and provides various types of information and data to the user, for example. The configuration of HMI 26 is described in more detail in connection with FIG. 4.

Like controller 13, ECU 27 includes a processor 271 such as CPU, a memory 272 such as ROM and RAM, and a communication module 273. Based on a signal(s) input from various vehicle-mounted sensors (not shown) and a map and a program that are stored in memory 272, ECU 27 controls vehicle 2. In the present embodiment, a main process performed by ECU 27 may be "charging guide process" of guiding a user of vehicle 2 to an available charging stand 1. The guide process performed by ECU 27 is described later herein. ECU 27 corresponds to "controller" according to the present disclosure.

Figure 4:
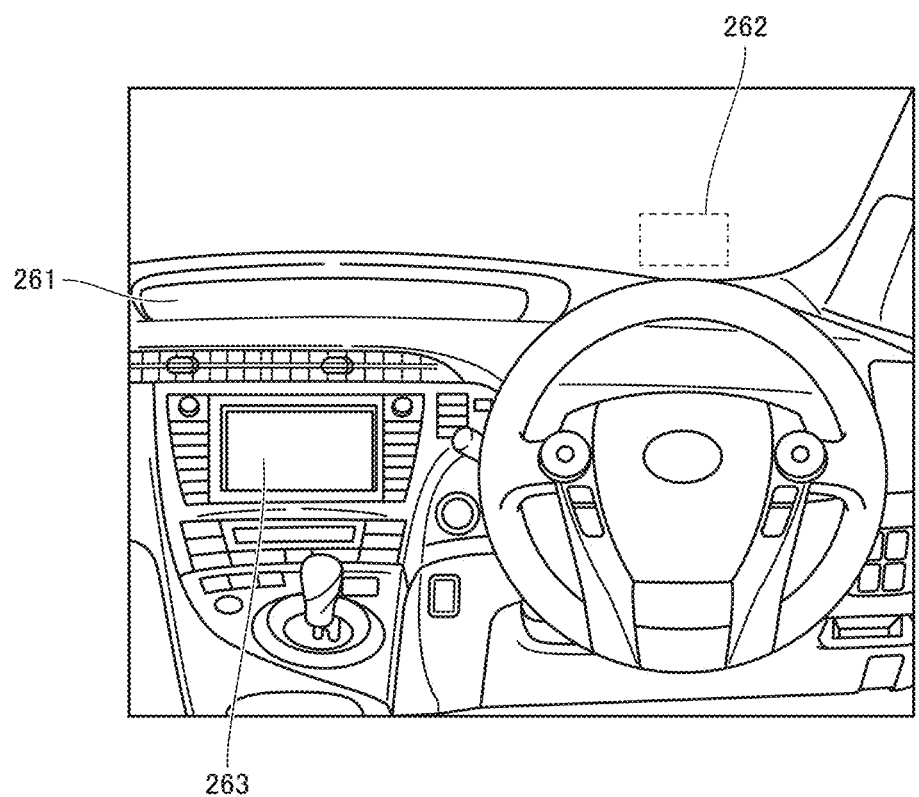
FIG. 4 shows an example configuration of an HMI.

FIG. 4 shows an example configuration of HMI 26. In the present embodiment, HMI 26 displays "charging guide information" for guiding a user of vehicle 2 to an available charging stand 1. Specifically. HMI 26 includes an instrument panel 261, an HUD (Head-Up Display) 262, a navigation screen 263, and a speaker (not shown).

Instrument panel 261 is a dashboard in which meters are placed, and displays various states of vehicle 2 in accordance with control by ECU 27. Instrument panel 261 displays a speedometer, a trip meter, the SOC of battery 23, and warning lights, and additionally displays charging guide information. Instead of instrument panel 261, a multi-information display (MID) may also be employed.

HUD 262 projects various types of information in the form of a virtual image on a forward field of view of a driver. Specifically. HUD 262 displays the speed of vehicle 2, the direction of travel to a destination, and traffic signs, for example. HUD 262 may display charging guide information.

Navigation screen 263 is a display of a navigation system (not shown). The navigation system includes a GPS receiver for identifying the position of vehicle 2 based on radio waves from artificial satellites (not shown). The navigation system displays, on navigation screen 263, the current position of vehicle 2 and a recommended route to a destination of vehicle 2, based on GPS data of vehicle 2 and road map data Navigation screen 263 may be a monitor with a touch panel (both are not shown). Navigation screen 263 can also display charging guide information.

The speaker outputs information about the states/state of charging stand 1 and/or vehicle 2. Thus, a user can obtain various types of information by means of the sense of hearing in addition to the sense of sight.

At least one of instrument panel 261, HUD 262, and navigation screen 263 of vehicle 2 corresponds to "display" according to the present disclosure. In the following, an example in which charging guide information is displayed on HUD 262 is described exemplarily. Charging guide information may alternatively be displayed on instrument panel 261 or navigation screen 263.

<Process Flow>

Figure 5:
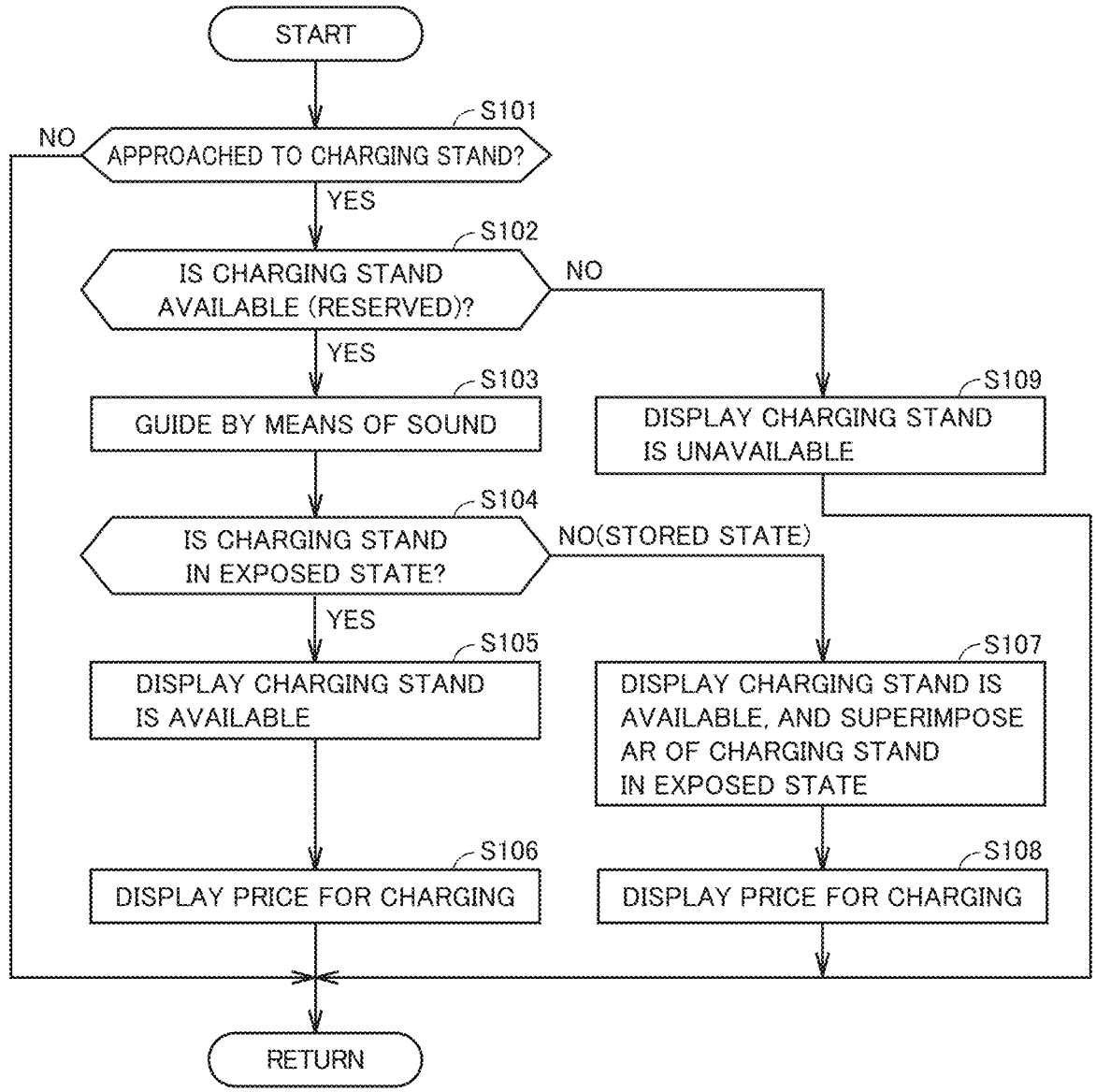
FIG. 5 is a flowchart showing a procedure of a charging guide process according to Embodiment 1.

FIG. 5 is a flowchart showing a procedure of a charging guide process according to Embodiment 1. This flowchart (and the following flowchart shown in FIG. 6) is called from a main routine (not shown) and executed repeatedly at predetermined intervals, for example. While each step is implemented through software processing by ECU 27, each step may also be implemented by hardware (electrical circuitry) placed in ECU 27. The step is abbreviated as S.

The following process is performed for each of a plurality of charging stands 1. For example, in the example shown in FIG. 1, the following process is performed for each set of five charging stands 1. In order not to complicate the description, however, the process performed for any one charging stand 1 is described here.

In S101, ECU 27 determines whether or not vehicle 2 has approached charging stand 1. For example, based on positional information about charging stand 1 and GPU information about vehicle 2, ECU 27 can determine that vehicle 2 has approached charging stand 1 when the distance between vehicle 2 and charging stand 1 is less than or equal to a predetermined value (a few meters to tens of meters, for example). When vehicle 2 has not approached charging stand 1 (NO in S101), ECU 27 causes the process to return to the main routine. When vehicle 2 has approached charging stand 1 (YES in S101), ECU 27 causes the process to proceed to S102.

In S102, ECU 27 determines whether or not charging stand 1 is available. For example, when charging stand 1 is reserved by a user of vehicle 2, ECU 27 can determine that charging stand 1 is available. Alternatively, when charging stand 1 is reserved by no one (vacant state), ECU 27 may determine that charging stand 1 is available.

When charging stand 1 is reserved by another user or when the current time falls in a time period in which use of charging stand 1 is inhibited, for example (NO in S102), ECU 27 controls HUD 262 to display that charging stand 1 is unavailable (S109). For example, ECU 27 may use the augmented reality (AR) technology to superimpose a cross mark on unavailable charging stand 1, or display unavailable charging stand 1 in a pale gray (gray out), for example. After this, the process is caused to return to the main routine.

In contrast, when charging stand 1 is available (YES in S102), ECU 27 uses sound that is output from the speaker (not shown) to guide vehicle 2 toward charging stand 1 (S103). For example, as vehicle 2 further approaches charging stand 1, the volume of beep sound that is output from the speaker may be increased. Alternatively, the direction of charging stand 1 as seen from vehicle 2 as well as the distance to charging stand 1 from vehicle 2 may be communicated to the user by means of sound.

In S104, ECU 27 determines whether or not charging stand 1 is in the exposed state. ECU 27 may acquire the information of whether charging stand 1 is in the exposed state or the stored state, through communication between vehicle 2 and charging stand 1. ECU 27 may determine whether charging stand 1 is in the exposed state or the stored state, based on an image of charging stand 1 captured with a camera (not shown) mounted on vehicle 2.

When charging stand 1 is in the exposed state (YES in S104), ECU 27 controls HUD 262 to display that charging stand 1 is available (S105). For example, ECU 27 may use the AR technology to superimpose a circular mark on available charging stand 1, to change the color of available charging stand 1, to add a pattern to available charging stand 1, to cause available charging stand 1 to flash on and off, and/or to enhance the contour of available charging stand 1, for example. These manners of display enable vehicle 2 (the user driving vehicle 2) to identify the position of available charging stand 1.

In S106, ECU 27 controls HUD 262 to further display the price for charging at charging stand 1. The price for charging may be the fees per unit time, the fees per unit electrical energy, or predicted fees required for fully charging battery 23.

In contrast, when charging stand 1 is in the stored state (NO in S104), ECU 27 controls HUD 262 to display that charging stand 1 is available (S107) as in S105. At this time, it is desirable that ECU 27 uses the AR technology to superimpose a virtual image of charging stand 1 in the exposed state, over the position of charging stand 1 in the stored state. When ECU 27 causes the image of charging stand 1 in the exposed state to be displayed, ECU 27 may also superimpose a circular mark, change the color, add a pattern, cause the stand to flash on and off, and/or enhance the contour, for example. These manners of display also enable vehicle 2 (the user driving vehicle 2) to identify the position of available charging stand 1.

The AR display, however, is not a requisite one. Specifically, ECU 27 may control HUD 262 to display an image showing charging stand 1 in the exposed state without displaying the actual landscape (charging stand 1 in the stored state).

In S108, ECU 27 controls HUD 262 to further display the price for charging at charging stand 1. After performing the process in S106 or S108, ECU 27 causes the process to return to the main routine.

As seen from the foregoing, according to Embodiment 1, available charging stand 1 is displayed on HUD 262 (or may be displayed on instrument panel 261 or navigation screen 263). Particularly when charging stand 1 is in the stored state, the AR display is performed to superimpose a virtual image of charging stand 1 in the exposed state over an image of charging stand 1 in the stored state. This enables the user to easily find available charging stand 1 and identify the position of charging stand 1, even w % ben charging stand 1 is in the stored state.

Embodiment 2

Charging stand 1 may also be used for feeding electric power from vehicle 2 to a distributed energy system such as microgrid. According to Embodiment 2, a configuration allowing electric power to be fed (sold) from vehicle 2 to a distributed energy system through charging stand 1 is described. According to Embodiment 2, "power-feeding guide process" of guiding a user of vehicle 2 to charging stand 1 that can feed electric power is performed.

The configuration of charging stand 1 and vehicle 2 is basically similar to the configuration (see FIGS. 1 to 4) described above in connection with Embodiment 1, and therefore, the description thereof is not repeated herein. Vehicle 2 is configured to be chargeable from charging stand 1 and additionally capable of feeding (discharging) electric power to charging stand 1.

FIG. 6 is a flowchart showing a procedure of a power-feeding guide process according to Embodiment 2. In S201, ECU 27 determines whether or not vehicle 2 has approached charging stand 1. When vehicle 2 has approached charging stand 1 (YES in S201), ECU 27 causes the process to proceed to S202.

In S202, ECU 27 determines whether or not charging stand 1 is available for feeding electric power to a distributed energy system. For example, when the demand for electric power is larger than the supply of electric power in the distributed energy system (or when it is predicted that the demand exceeds the supply in the near future), charging stand 1 receives notification of this fact from a management server (not shown) for the distributed energy system. In this case, charging stand 1 provides, to vehicle 2, information that electric power can be fed to the distributed energy system. Vehicle 2 may receive this information from the management server.

When charging stand 1 cannot be used for feeding electric power to the distributed energy system, such as when the current time falls in a time period in which the demand for electric power is low (NO in S202), ECU 27 controls HUD 262 to display that electric power cannot be fed from vehicle 2 to charging stand 1 (S109). As the manner of display, a manner similar to the one used for the process in S109 (see FIG. 5) may be used.

In contrast, when electric power can be fed from vehicle 2 to charging stand 1 (YES in S202). ECU 27 uses sound that is output from the speaker (not shown) to guide vehicle 2 toward charging stand 1 (S203).

In S204, ECU 27 determines whether or not charging stand 1 is in the exposed state. When charging stand 1 is in the exposed state (YES in S204), ECU 27 controls HUD 262 to display that electric power can be fed from vehicle 2 to charging stand 1 (S205). As the manner of display, the manner similar to the one used for the process in S105 (see FIG. 5) may also be used. Moreover, ECU 27 controls HUD 262 to further display the electric power selling price at charging stand 1 (S206). The electric power selling price is the fees per unit electrical energy, for example.

In contrast, when charging stand 1 is in the stored state (NO in S204), ECU 27 controls HUD 262 to display that electric power can be fed from vehicle 2 to charging stand 1 (S207). As the manner of display, the manner similar to the one for the process in S107 (see FIG. 5) such as AR display may be used. ECU 27 then controls HUD 262 to display the charging price at charging stand 1 (S208).

As seen from the foregoing, according to Embodiment 2, charging stand 1 that can feed electric power is displayed on HUD 262 (may be displayed on instrument panel 261 or navigation screen 263). Particularly when charging stand 1 is in the stored state, the AR display is performed to superimpose a virtual image of charging stand 1 in the exposed state over an image of charging stand 1 in the stored state. This enables the user to easily find charging stand 1 that can feed electric power and identify the position of charging stand 1, even when charging stand 1 is in the stored state.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle configured to enable electric power to be fed from a charging facility to the vehicle and/or fed from the vehicle to the charging facility,
    the charging facility comprising:
        a movable device having a connector to be connected to the vehicle; and
        an elevation device that lifts and lowers the movable device between a stored state in which the movable device is stored underground and an exposed state in which the movable device is exposed from ground, and
    the vehicle comprising:
        a display; and
        a controller that controls, when the charging facility is available, the display to display that the charging facility is available, in a manner that a position of the charging facility can be identified from the vehicle,
    wherein when the charging facility is available and the movable device is in the stored state, the controller controls the display to display the movable device in the exposed state.

2. The vehicle according to claim 1, wherein the controller controls the display to display an augmented reality in which an image of the movable device in the exposed state is superimposed on an image of the movable device in the stored state.

3. The vehicle according to claim 1, wherein when the charging facility is unavailable, the controller controls the display to display that the charging facility is unavailable.

4. The vehicle according to claim 1, wherein the controller controls the display to further display a price for electric power traded through the charging facility.

5. The vehicle according to claim 1, wherein the display includes a head-up display.

6. The vehicle according to claim 1, further comprising a speaker that informs, when the charging facility is available, a user of the vehicle that the vehicle has approached the charging facility.

7. A charging system comprising:
    the vehicle according to claim 1; and
    the charging facility.

8. A method of controlling a vehicle comprising a display and configured to enable electric power to be fed from a charging facility to the vehicle and/or fed from the vehicle to the charging facility,
    the charging facility comprising:
        a movable device having a connector to be connected to the vehicle; and
        an elevation device that lifts and lowers the movable device between a stored state in which the movable device is stored underground and an exposed state in which the movable device is exposed from ground, and
    the method comprising:
    acquiring information of whether or not the charging facility is available; and
    displaying, when the charging facility is available, on the display that the charging facility is available, in a manner that a position of the charging facility can be identified from the vehicle; and
    displaying, when the charging facility is available and the movable device is in the stored state, on the display the movable device in the exposed state.

* * * * *